(12) United States Patent
Sorkin

(10) Patent No.: US 6,622,134 B1
(45) Date of Patent: Sep. 16, 2003

(54) METHOD OF CONSTRUCTING DATA CLASSIFIERS AND CLASSIFIERS CONSTRUCTED ACCORDING TO THE METHOD

(75) Inventor: Gregory Bret Sorkin, Pleasantville, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/225,801

(22) Filed: Jan. 5, 1999

(51) Int. Cl.[7] .............................. G06F 15/18; G06E 1/00
(52) U.S. Cl. ........................................... 706/20; 706/12
(58) Field of Search ..................................... 706/20, 12

(56) References Cited

U.S. PATENT DOCUMENTS

| | | | | |
|---|---|---|---|---|
| 5,640,492 A | * | 6/1997 | Cortes et al. ................ | 706/20 |
| 5,649,068 A | * | 7/1997 | Boser et al. ................. | 706/12 |
| 5,675,711 A | * | 10/1997 | Kephart ....................... | 706/12 |
| 6,016,546 A | * | 1/2000 | Kephart et al. .............. | 713/200 |
| 6,192,360 B1 | * | 2/2001 | Dumais et al. ............... | 707/6 |
| 6,327,581 B1 | * | 12/2001 | Platt ............................ | 706/12 |

OTHER PUBLICATIONS

Sutton et al, "Effects of Normalization Constraints of Competitive Learning", IEEE Transactions on Neural Networks, May 1994.*

* cited by examiner

*Primary Examiner*—George B. Davis
(74) *Attorney, Agent, or Firm*—Whitham, Curtis & Christofferson, P.C.; Stephen C. Kaufman

(57) ABSTRACT

A method of constructing data classifiers in cases where the number of features is much larger than the number of training examples and it is critical to avoid overtraining, is particularly useful in recognizing computer objects containing or likely to contain a computer virus. The method provides a novel way of tolerating imperfectly classifiable data, of learning in time polynomial in the size of the input data, and of avoiding overtraining. Training is performed by constructing and solving a linear program (LP) or integer program (IP).

23 Claims, 4 Drawing Sheets

METHOD OF CONSTRUCTING DATA CLASSIFIERS AND CLASSIFIERS CONSTRUCTED ACCORDING TO THE METHOD

BACKGROUND OF THE INVENTION

1. Field of the Invention

The present invention generally relates to the field of automatic pattern classification and, more particularly, to the construction of a classifier of computer files that recognizes computer objects containing or, likely to contain, a computer virus, to the construction of a classifier of documents on a network capable of recognizing documents pertaining to, or likely to pertain to, a selected subject, and to the construction of a classifier capable of recognizing images containing, or likely to contain, a human face, at approximately a given range and orientation.

2. Background Description

The classification of data is required in many applications. Among the most successful classifiers are artificial neural networks. See, for example, D. Rumelhart, J. McClelland, and the PDP Research Group, *Parallel Distributed Processing: Explorations in the Microstructure of Cognition*, MIT Press (1986). The simplest case of such a neural network is a perceptron, or single-layer neural network, as described by M. Minsky and S. Papert, *Perceptrons: An Introduction to Computational Geometry*, MIT Press (1969). As referred to herein, a perceptron is defined as having a single, real-valued output, which is a linear combination of its several, real-valued inputs. If the perceptron's input generates an output value exceeding some threshold, it is classified as positive; otherwise, it is negative. The classifier is defined by a choice of the threshold and linear combination. This choice is generally made so as to give the correct classification on all (or as many as possible) of a set of training examples whose classes are known.

Once defined, the classifier may be used to classify new examples. An important issue is to design the classifier in such a way as to minimize the chance that a new example is classified incorrectly. The probability of error may be characterized mathematically, notably by the PAC (Provably Approximately Correct) learning model. See, for example, L. G. Valiant, "A Theory of the Learnable", *Communications of the ACM*, 27(11):1134–1142 (1984), and M. J. Kearns and U. V. Vazirani, *An Introduction to Computational Learning Theory*, MIT Press (1994).

One standard approach to training of a perceptron classifier is by an iterative improvement procedure called the perceptron learning algorithm, as described by Minsky and Papert, supra. (The perceptron learning algorithm was generalized to back propagation learning by Rumelhart, McClelland et al., supra, for more complex, multi-layer neural networks.) The algorithm is only guaranteed to converge, in principle, when the training data can be classified perfectly by a perceptron. This is seldom the case. For example, convergence is not possible if there are any errors in the data, if there is not enough information to do perfect classification, or if the classification problem is too complex for the perceptron model.

Even when convergence is possible, learning can be very slow if there is very little "slack" between positive and negative examples. Slack is small if there are both positive and negative examples that are very close to any hyperplane dividing the two classes; or equivalently, if, for any choice of the linear combination and threshold, the outputs for some positive and negative examples will fall close to the threshold. The issue of convergence rate was addressed by A. Blum, A. Frieze, R. Kannan, and S. Vempala in "A Polynomial-Time Algorithm for Learning Noisy Linear Threshold Functions", *Proceedings of the 37th Annual IEEE Symposium on Foundations of Computer Science*, pp. 330–338, October 1996.

A second difficulty, also addressed by Blum, Frieze, Kannan, and Vempala, Ibid., is how to construct a classifier when the training examples themselves are not perfectly separable by a hyperplane.

A third difficulty is that of over-training. If the number of input variables, or features, is comparable to, or larger than, the number of training examples, then the generalization ability of a classifier is likely to be terrible. The error rate on new examples will be very high. A rule of thumb is that the error rate decreases with the number of features divided by the number of training examples.

SUMMARY OF THE INVENTION

It is therefore an object of the invention to provide a method of efficiently constructing classifiers in cases where the number of features is much larger than the number of training examples. In particular, it is an object of the invention, in such cases, to construct a classifier which makes use of a small subset of the full set of features.

It is another object of the invention to provide a method of efficiently constructing classifiers in cases where it is critical to avoid over training.

It is yet another object of the invention to provide a method of efficiently constructing classifiers in cases where data is not perfectly classifiable by any perceptron.

It is still another object of the invention to provide a method of efficiently constructing classifiers in cases where any two of, or all three of these conditions pertain.

A further object of the invention to provide a method of constructing a classifier of computer files that recognizes computer objects containing or likely to contain a computer virus.

Another object of the invention to provide a method of constructing a classifier of computer files that recognizes computer files pertaining to or, likely to pertain to a selected subject.

The present invention is a method of constructing a classifier of data while tolerating imperfectly classifiable data, learning in time polynomial in the size of the input data, and avoiding overtraining. The present invention is suitable for large problems with thousands of examples and tens of thousands of features. Superior results are achieved by the present invention by coupling feature selection with feature weighting, two tasks that are normally done independently of each other. Training is performed by constructing and solving a linear program (LP) or integer program (IP) or other optimization algorithm.

Thus, the present invention is a method of constructing a linear classifier of data. In one preferred embodiment, first a set of real n-vector examples (referred to as examplars) $v^i$, is provided, along with a classification of each as either positive or negative. Each dimension j of the n-dimensional space is a feature of the vector; for example $v^i$, the $j^{th}$ feature's value is $v_j^i$.

Next, a linear program (LP) or integer program (IP) is constructed that includes a feature variable $w_j$ corresponding to each feature j. The feature variables are used to discover a thick hyperplane, a pair of parallel hyperplanes separating positive examples from negative examples.

In a second preferred embodiment, based on a classification of each feature as either excitatory or inhibitory, the first LP or IP is modified to produce a second LP or IP. The purpose of the second LP or IP is to eliminate extraneous features. In a third preferred embodiment, exception variables are incorporated into the second LP or IP to produce a third LP, IP or mixed integer-linear program. The third LP or IP permits construction of a good classifier for noisy training data where a perfect classifier may not exist.

The second LP or IP may be constructed directly from the input examples and their classifications, without explicitly constructing the first. Likewise, the third LP or IP may be constructed directly, without explicitly constructing the first or second.

An LP or IP technique or other optimization algorithm may then be used to solve the construction, either exactly or approximately. A solution's exception variables are disregarded. Optionally,feature variables with small values in the solution are set to zero. Finally, the remaining non-zero value variables define the linear classifier.

The classifier constructed according to the invention may be separately incorporated into an application program. For example, a detector of computer viruses may incorporate a classifier according to the method of the invention.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
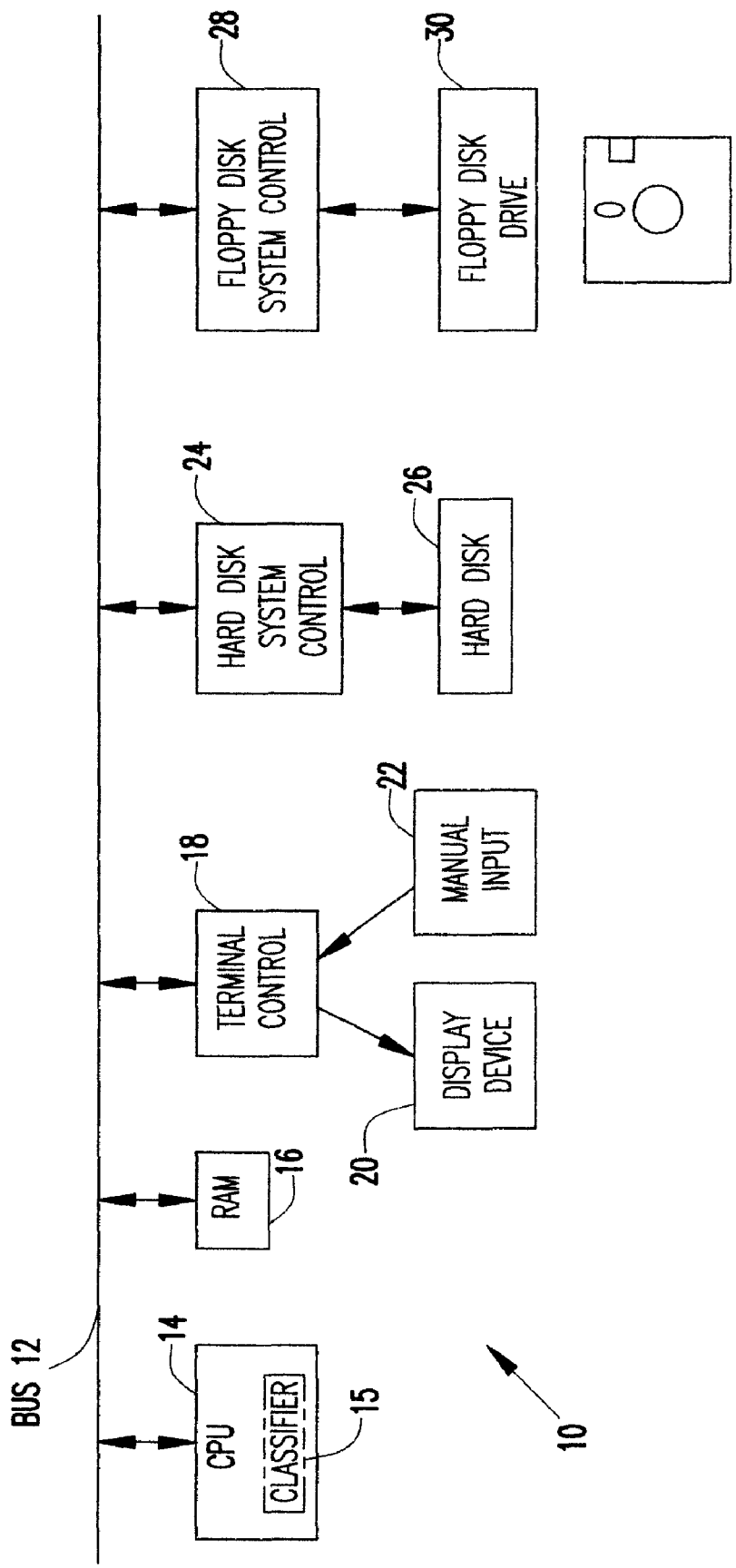
FIG. 1 is a block diagram of a computer system on which the method according to the invention may be implemented.

Referring now to the drawings, and more particularly, to FIG. 1, there is shown a computer system 10 on which the method of constructing a classifier according to the invention may be implemented. Bus 12 is comprised of a plurality of signal lines for conveying addresses, data and controls between a Central Processing Unit (CPU) 14 and a number of other system units connected to the bus. A Random Access Memory (RAM) 16 is coupled to the system bus 12 and provides program instruction storage and working memory for the CPU 14. A terminal subsystem 18 is coupled to the system bus 12 and provides outputs to a display device 20, typically a Cathode Ray Tube (CRT) monitor, and receives inputs from a manual input device 22, such as a keyboard and/or pointing device (e.g., mouse, trackball, etc.). A hard disk control subsystem 24 bidirectionally couples a hard disk storage device 26 to the system bus 12. The control 24 and hard disk storage device 26 provide mass storage for CPU instructions and data. A floppy disk control subsystem 28 similarly couples a floppy disk drive 30 to the system bus 12. Other input devices, such as a Compact Disk-Read Only Memory (CD-ROM), may also be connected to the system bus 12. Programs embodying the invention may be stored in floppy disk or a CD-ROM disk for introduction into the computer system 10 and storage in RAM 14 or hard disk storage device 26. The classifier 15 according to the invention is constructed by the CPU 14 in accordance with the method described below. Once constructed, the classifier 15 may be incorporated into an application program by recording on a floppy disk, CD-ROM or other computer readable media.

As will be understood by those skilled in the art, the components of the computer system 10 illustrated in FIG. 1 may be embodied within a personal computer, such as IBM's PS/2 or ThinkPad series of computers, a workstation connected to a network, such as IBM's RS/6000 series of workstations, a minicomputer, such as IBM's AS400 series of minicomputers, or a mainframe computer supporting one or more terminals, such as IBM's ES9000 series of main frame and supercomputers. Further, a suitable operating system (OS), such as IBM's OS/2 operating system or Microsoft's Windows operating system for personal computers, IBM's AIX operating system based on the UNIX operating system for workstations, and IBM's VM operating system for mainframe computers, are run on the computer system 10 to support various application programs.

A preferred application of a classifier of data constructed according to the present invention is the classification of computer programs into those that contain computer viruses and those that do not. A second preferred application of a classifier of data constructed according to the present invention is the classification of documents on a network, e.g., what is typically referred to as the Internet, into objects that pertain to a selected subject and objects that do not. Once constructed, such a classifier could then be incorporated into a search engine, which could be used to look through many documents, selecting relevant ones, i.e., those classified positively. However, other applications include classification of documents by subject (e.g., on a local network or file system), classification of speech segments into specific phonemes or words, classification of handwritten zip code digits into the numbers 0 through 9, classification of images of aircraft into their types and models, and so forth.

Figure 2:
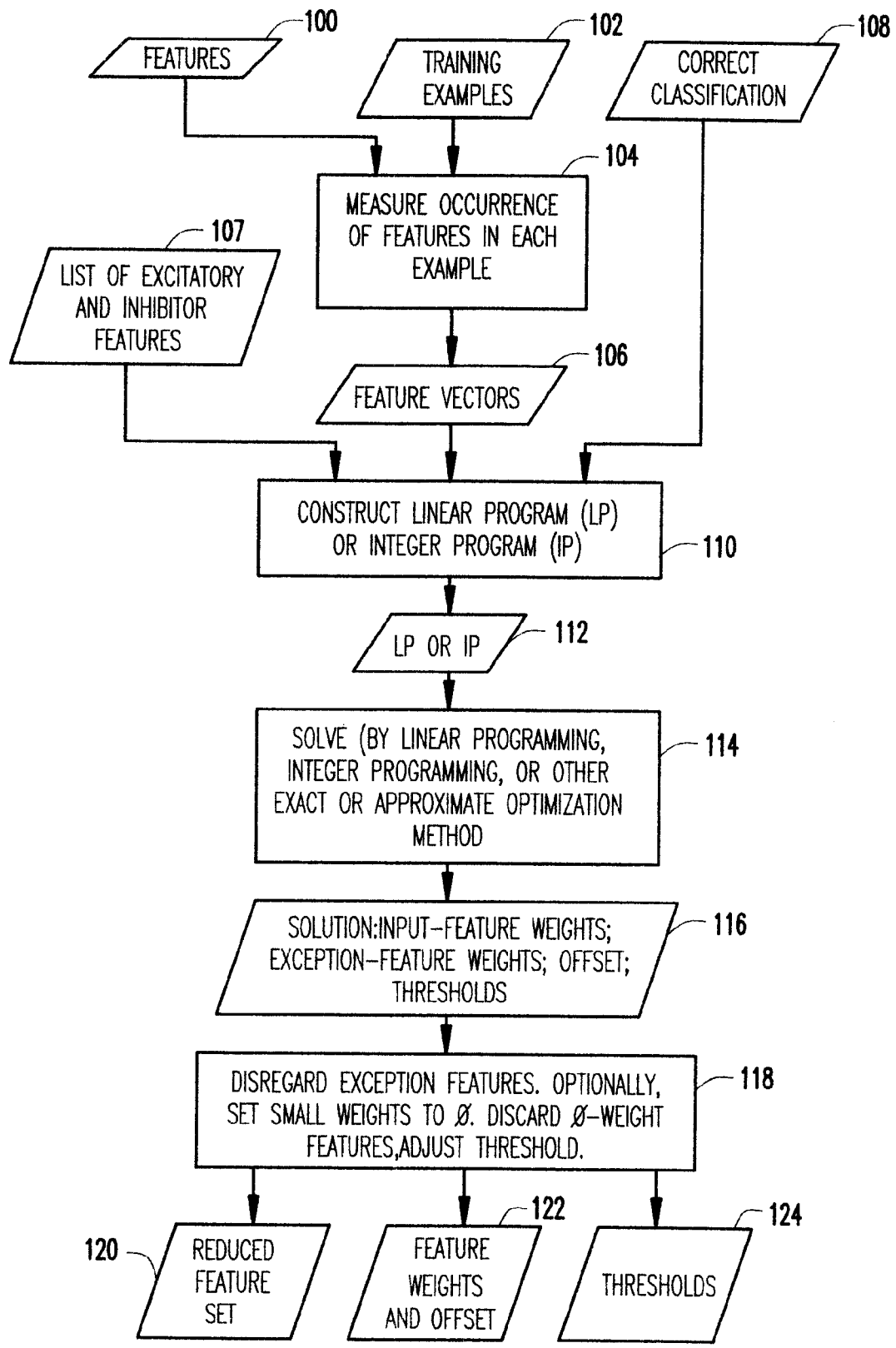
FIG. 2 is a flow diagram for the preferred embodiment learning or training phase.

Turning now to FIG. 2, the preferred embodiments of the present invention may best be understood with reference to the above described data classification approach of, for example, Minsky and Papert or Blum, Frieze, Kannan, and Vempala, supra. Features 100 and training examples 102 are provided and, in step 104, the occurrence of each feature in each example is measured to generate feature vectors 106. Correct classifications 108, feature vectors 106, and a list of excitatory and inhibitory features 107 are used in step 110 to construct a linear program (LP) or an integer program (IP) 112.

This LP or IP 112 is solved in step 114using a typical LP solver, IP solver, mixed integer-linear program solver, or other optimization method. In one such typical approach, construction of a data classifier can be expressed by an LP constructed in step 110 as follows:

training examples: A set of training examples $v^1, \ldots, v^m$, each a real n-vector, are input to the data classifier. Each dimension $j=1, \ldots, n$ is called a feature.

variables: There is a variable $w_j$ (called a feature weight) for each feature, j, an additional variable $w_0$ (an offset), and another additional variable $\alpha$ (a hyperplane thickness). The feature weights are constrained to $0 \leq w_j \leq 1$ (for each $j=1, \ldots, n$). The offset $w_0$ is unconstrained.- constraints: Each positive example i produces the constraint that:

$$w_0 + \sum_{j=1}^{n} w_j v_j^i \geq \alpha.$$

Each negative example i produces the constraint that:

$$w_0 + \sum_{j=1}^{n} w_j v_j^i \leq 0.$$

objective: The LP's objective function is to maximize $\alpha$.

The classifier constructed by solving this LP in step 114 classifies the training data perfectly if $\alpha > 0$ and is meaningless if $\alpha \leq 0$.

The solution 116 includes input feature weights $w_j$, exception feature weights (discussed hereinbelow) and thresholds 0 and $\alpha$. Finally, in step 118, exception features and zero weight features are disregarded, resulting in a reduced feature set 120, feature weights 122 and threshold 124. Optionally, in step 118, small weights may be set to zero.

However, by altering procedure 110 for generating the LP or IP, the present invention includes several steps that are improvements over the prior art. These steps are:

Minimize Number of Non-Zero Weights;

Minimize Classification Error by Specifying a Gap;

Allow for Imperfect Classifiability; and

Cleanup after Solution.

Minimize Number of Non-Zero Weights

As has been described hereinabove, over-training is a serious (often a show-stopping) issue. Occam's Razor, the principle of choosing a succinct hypothesis which explains the training data, provides one way of addressing overtraining. It can be shown that under certain conditions, appropriately defined "Occam learning" gives good generalization to new examples. See M. J. Kearns and U. V. Vazirani, *An Introduction to Computational Learning Theory*, MIT Press (1994). But Occam's Razor is itself only a general philosophical principle and does not prescribe any specific procedure.

In the preferred embodiment, for learning of a linear separator, the principle of Occam's Razor is interpreted as the minimization of the number of non-zero feature weights. Since zero weight features are irrelevant to classification, this minimizes the number of features that are inspected in performing classification. U.S. Pat. No. 5,675,711 to J. O. Kephart et al. entitled "Adaptive Statistical Regression and Classification of Data Strings, With Application to the Generic Detection of Computer Viruses" teaches another method of minimizing the number of features used.

For the preferred embodiment of the present invention, in step 110 and step 118, the number of non-zero feature weights is minimized, indirectly, by minimizing the sum of all weights. Thus, for this preferred embodiment, the LP differs from the above described LP as follows:

input features: Each feature j is categorized as either excitatory or inhibitory in input data step 100. (In certain applications, such as classification of computer files as viral or non-viral, all features are excitatory.)

variables: For excitatory features j, the corresponding weight must be positive, i.e., $w_j \geq 0$. For inhibitory features j, the corresponding weight must not be positive, i.e., $w_j \leq 0$. The offset $w_0$ is unconstrained. The hyperplane thickness $\alpha$ is constrained to be equal to an input parameter $\alpha = \alpha_{input}$. (In a preferred implementation, $\alpha_{input} = 1$.

constraints: As before, each positive example i produces the constraint that:

$$w_0 + \sum_{j=1}^{n} w_j v_j^i \geq \alpha.$$

Each negative example i produces the constraint that:

$$w_0 + \sum_{j=1}^{n} w_j v_j^i \leq 0.$$

objective: The LP's objective is to minimize $$\sum_{j=1}^{n} |w_j| = \sum_{j \text{ excitatory}} w_j - \sum_{j \text{ inhibitory}} w_j.$$

Minimizing the sum of the absolute values of the weights also tends to minimize the number of non-zero weights, thus eliminating extraneous features. This preferred embodiment method is based on a priori determination in 100 of whether each feature j is excitatory or inhibitory.

For the above example of computer file classification as either viral or non-viral, in a preferred implementation, features indicate the presence of indicative substrings in the file. All features are excitatory and the presence of a viral substring in an object is strong evidence of infection. However, the presence of non-viral substrings is not evidence of a virus's absence.

Likewise, for classification of documents retrieved, for example, from what is known as the Internet or the World Wide Web (WWW), the presence of key words or phrases in such a document is a strong indication that the document is related to certain subjects. Conversely, there may be words or phrases indicating that the document is not related to a given subject; for example, it might be unlikely that a document containing the word "phlebotomy" pertains to sports cars.

In still other cases, an a priori classification of a feature as excitatory or inhibitory may not be available. An example is provided by the goal of recognizing whether a grey-scale image, represented as a vector of pixel intensities, contains a human face at a approximately a given scale and orientation: it is not clear a priori whether a given pixel's strength is indicative or contra-indicative of the presence of a face in the image. In such a case, we proceed as follows.

Any feature whose classification as excitatory or inhibitory is not known is replaced by a pair of features, one classified as positive and the other as negative. That is, if feature j's classification is unknown, then in each input vector v, the entry $v_j$ is duplicated: $v = v_1, v_2, \ldots, v_j, \ldots, v_n$ is replaced with $v = v_1, v_2, \ldots, v_j, v_{j'}, \ldots, v_n$, feature j is taken to be excitatory, and feature j' is taken to be inhibitory. Correspondingly, the output of the inventive procedure includes feature weights $w_1, w_2, \ldots, w_j, w_{j'}, \ldots, w_n$. In an optimal solution, either $w_j$ or $w_{j'}$ will be equal to 0. If the solution computed is not optimal, and both weights are non-zero, then the weight that is larger in absolute value should be replaced by the sum of the two weights, and the other weight should be replaced by 0.

In the face-detection application, since no feature is known a priori to be excitatory or inhibitory, this procedure doubles the number of feature weight variables.

The fact that many linear programming solvers return so-called "basic" optimal solutions gives extra power to minimizing the number of non-zero feature weights by setting as the linear objective the minimization of the sum of the absolute values of the feature weights. This is illustrated by a case in which two different features capture exactly the same information, so that for every training vector i, entries j and k are always equal: $v_j \equiv v_k$. In such a case, if a first optimal solution has both $w_j$ and $w_k$ non-zero, then there are two corresponding basic optimal solutions, in each of which one of $w_j$ and $w_k$ is zero, while the other is the sum of the two values in the first solution. Thus, basic solutions assist in our goal of minimizing the number of non-zero weights.

Minimize Classification Error by Specifying a Gap

Another feature of the present invention is that, in step 110, a minimum separation is specified between the outputs for positive and negative examples. The size of this gap is only meaningful when a scale is imposed on the feature weights. In a preferred implementation, represented by a third LP as follows, the scale is imposed by constraining feature weights to be at most 1 in absolute value:

variables: Excitatory feature weights are constrained by $0 \leq w_j \leq 1$ and inhibitory feature weights are constrained by $-1 \leq w_j \leq 0$. The offset is unconstrained. The hyperplane thickness is constrained to be equal to an input parameter, $\alpha = \alpha_{input}$.

constraints: As before, each positive example i produces the constraint that:

$$w_0 + \sum_{j=1}^{n} w_j v_j^i \geq \alpha.$$

Each negative example i produces the constraint that:

$$w_0 + \sum_{j=1}^{n} w_j v_j^i \leq 0.$$

objective: As before, the LP's objective is to minimize $$\sum_{j=1}^{n} |w_j| = \sum_{j \text{ excitatory}} w_j - \sum_{j \text{ inhibitory}} w_j.$$

The purpose of forcing such a gap is to counter noise. Thus, if the classifier performs imperfectly on a new (non-training) example, the imperfection, presumably, will be smaller than the gap and the example will still be classified correctly. In a preferred implementation $\alpha_{input} = 1$.

While a "thick hyperplane" (i.e., a pair of parallel hyperplanes separated by a fixed distance or gap) separating positive and negative examples may have occurred, accidentally, in prior art output classifiers, a gap has not been, heretofore, intentionally forced in the separation. However, as taught herein the gap is imposed, for the purpose of minimizing classification error on new examples. Imposition of the gap means that the LP may be infeasible, in which case no classifier is produced. This issue is addressed in the next section.

It should be noted that the perceptron learning algorithm described by Minsky and Papert, supra, can be shown to converge in time related to the size of the largest gap separating positive from negative examples. The learning algorithm of Blum, Frieze, Kannan, and Vempala correctly classifies examples which lie outside of a thick hyperplane, while giving an "I don't know" classification to those inside it.

Allowance for Imperfect Classifiability

Perfect classification of training data may be impossible, especially under the restrictions that the classifier be linear, and under the further restrictions imposed by the present invention, specifically: (1) that all feature weights have a specified sign; and (2) that the output should respect a gap between positive and negative classification.

To allow for imperfect classifiability, the LP is modified as follows to allow "exceptional" examples to have their classifications corrected explicitly by an "exception" variable. A new "exception" or "tolerance" variable $x_i \geq 0$ is introduced for each example, along with a "false positive penalty" parameter $p^-$, and a "false negative penalty" parameter $p^+$.

variables: Excitatory feature weights are constrained by $0 \leq w_j \leq 1$ and inhibitory feature weights are constrained by $-1 \leq w_j \leq 0$. The offset is unconstrained. The hyperplane thickness is constrained to be equal to an input parameter, $\alpha = \alpha_{input}$. Exception variables $x_i$ are unconstrained.

constraints: Each positive example i produces the constraint that:

$$w_0 + \sum_{j=1}^{n} w_j v_j^i + x_i \geq \alpha.$$

Each negative example i produces the constraint that:

$$w_0 + \sum_{j=1}^{n} w_j v_j^i - x_i \leq 0.$$

objective: The LP's objective is to minimize $$\sum_{j=1}^{n} |w_j| + \sum_{i \text{ positive}} p^+ x_i - \sum_{i \text{ negative}} p^- x_i.$$

The output classifier is defined by the feature weights ($w_1, \ldots w_n$) alone, not the "exception" values $x_i$. Thus, if a positive example's variable $x_i$ were positive, the example will be classified correctly in the learning phase, but the output classifier's output will fall short of $\alpha$ by $x_i$ and may classify the example as negative; the objective function term $p^+ x_i$, therefore, penalizes a "false negative" classification in proportion to the "false negative" parameter $p^+$ and the example's shortfall, $x_i$, from the positive classification threshold. The same is true of the "false positive" penalty parameter $p^-$.

In the learning or training phase of FIG. 2, it is possible to correctly classify all training examples; even if only by setting every weight $w_j = 0$, setting $x_i = \alpha$ for each positive example and, setting $x_i = 0$ for each negative example. However, even if $p^+$ is as small as 1, the objective value will be smaller when numerous positive examples are properly classified by use of a few features $w_j$, rather than having their classification forced, one by one, with the exception variables $x_i$. Thus, the LP always has a trivial feasible solution, but when data is mainly, or completely, classifiable by a linear classifier, the classifier and its exceptions give a better solution to the LP; the method of the present invention will find such a preferable solution, provided one exists.

The intended use of the classifier determines how $p^+$ and $p^-$ should be set. For a computer virus detection application as provided in U.S. patent application Ser. No. 08/890,013 entitled "Efficient Detection of Computer Viruses and Other Data Traits" to J.O. Kephart et al. U.S. Pat. No. 6,016,546, classifying a virus as non-viral (i.e., a false negative) merely means that the virus must be detected in a slightly less memory-efficient manner; classifying a non-virus as viral (i.e., a false positive) requires extra processing time to correct the erroneous classification, a slightly costlier error. To achieve this balance, that false positives are slightly worse, while neither type of error is severe, the false-negative penalty is set to $p^+=1$, and the false-positive penalty is set to $p^-=2$.

In a document classification application, different trade-offs are possible depending on what is most important is to a user. If it is more important to select only documents that are in a particular category, e.g., for casually browsing information on new cars, then p should be large; if it is important to ensure that every document of interest to the user is included and none are overlooked, e.g., searching for legal precedent or medical information, then $p^+$ should be large. If it is important to minimize classifier size (i.e., number of features selected) and both types of error are tolerable; e.g., for the above computer virus scanning example, then $p^-$ and $p^+$ should both be small.

Solution

For any of the linear programs described herein, a related integer program (IP) or mixed integer-linear program may be constructed instead. Most natural would be to constrain the excitatory feature weights to lie in a finite set, such as $w_j \in \{0,1\}$, and the inhibitory weights in a similar set, such as $w_j \in \{0,-1\}$. The gap $\alpha_{input}$ would then, most likely, be chosen either as an integer greater than 1, or as a fraction greater than 1. For example, $\alpha_{input}=2.5$ would require the presence of at least 3 features for positive classification. Exception weights $x_i$ might be constrained to be non-negative real values, non-negative integers, or members of a finite set such as $\{0,1\}$. The other constraints and objective function are as before.

Once constructed, the LP may be solved by any well known standard method, including but not limited to the simplex method, the ellipsoid method, or interior-point methods. Alternatively, the corresponding IP, with variables' values restricted to be non-negative integers in some range, may be solved by any standard method including but not limited to branch-and-bound or branch-and-cut. Alternatively, either the LP or the IP may be solved or approximately solved by any other method including but not limited to simulated annealing or other iterative improvement methods.

Cleanup

Especially if an LP solver is used, the solution may include a multitude of small weights. To improve efficiency, these may be set to zero in step 118. In practical terms, setting all weights less than 0.1 to zero has little effect on the solution. Setting a weight $w_j$ to 0 corresponds to disregarding the corresponding, $j^{th}$, feature, and it is thus that feature weighting and feature selection are integrated by the inventive method. Feature selection is important both to avoid over-training, as discussed above, and also to make application of the classifier efficient. In application, to classify an example, it is necessary first to measure the strengths of the features in the example. This is often the most expensive aspect of the classification process, and is minimized by minimizing the number of features that need to measured.

The classifier classifies new testing examples or real-world examples as follows. Strengths for each feature are measured to define a vector. The dot product of this vector and the classifier's weight vector is added to the classifier's offset to define the classifier's response to the example. If the response is no more than a first threshold, the example is classified as negative. If the response is at least as large as a second threshold, the example is classified as positive. If the response lies between the two thresholds, the example is classified as "don't know". By default, the first threshold is set to 0, and the second threshold is set to $\alpha$. However, different thresholds may be used instead, as discussed next.

It is likely that the classifier will work somewhat less well on new real-world or testing examples than it did on the training examples. The built-in gap of $\alpha$ between positive and negative classification leaves some room for error on new examples. This may be exploited by operating the classifier with modified thresholds; For example, if $\alpha_{input}=1$, by design, any positive example should induce a response of at least 1, and any negative example should induce a response of at most 0. We may choose to classify an example as negative if, for example, its induced response is at most 0.1, to classify it as positive if its response is at least 0.9, and to classify it as "don't know" otherwise. Alternatively, we may eliminate the "don't know" case by setting the two thresholds equal to one another. In a preferred implementation, we may classify an example as negative if its induced response is less than 0.3, and classify it as positive if its induced response is at least 0.3. In practice, this has resulted in accurate classification of test examples that were not included in the training set.

Figure 3:
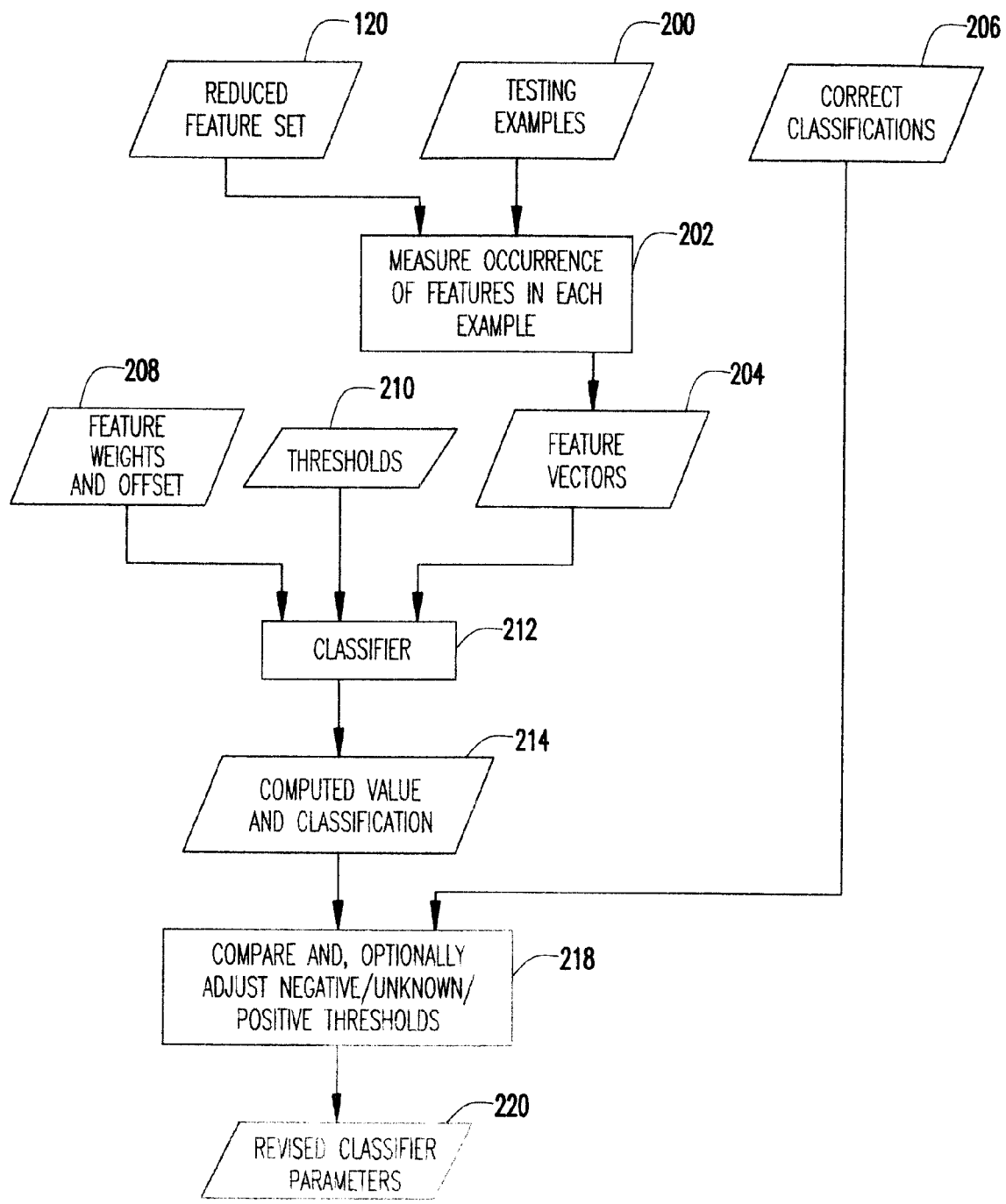
FIG. 3 is a flow diagram for the preferred embodiment testing phase.

Therefore, after the training phase of FIG. 2, the data classifier is tested in a testing phase as represented in FIG. 3. Testing examples 200 are provided and, in step 202, the occurrence of each feature of the reduced feature set 120 in each testing example 200 is measured to generate feature vectors 204. The feature vectors 204 along with correct classifications 206, feature weights and offsets 208, and thresholds 210 are evaluated in step 212. The evaluation generates values and classifications in 214 which are compared against the correct classifications 206 in step 218. Optionally, in step 218, thresholds are adjusted to provide revised classifier parameters 220.

Figure 4:
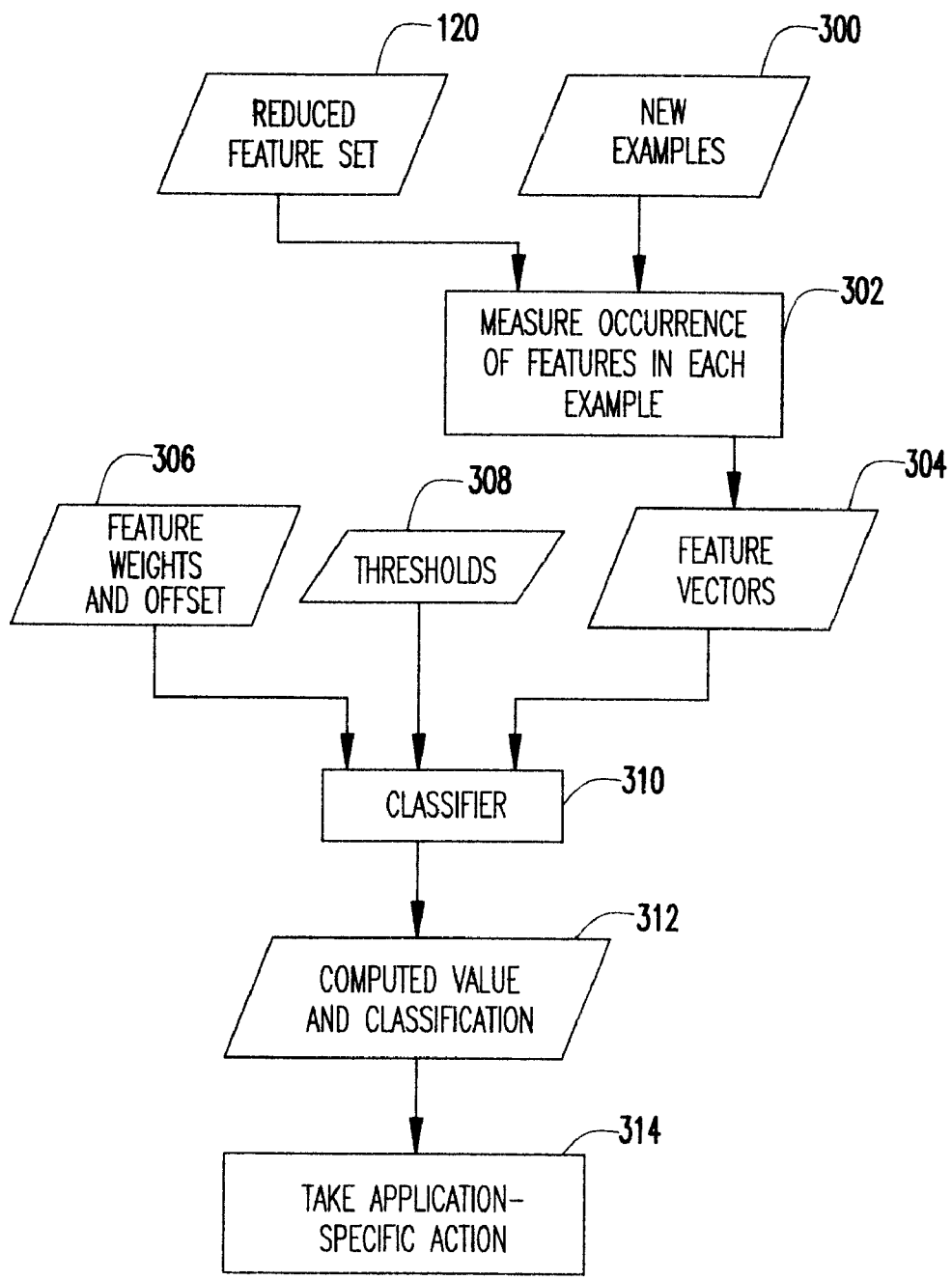
FIG. 4 is a flow diagram for the preferred embodiment application phase.

After the testing phase of FIG. 3, the data classifier may be used on real world examples as in FIG. 4. Thus, examples 300 are provided and, in step 302, the occurrence of each feature of the reduced feature set 120 in each example 300 is measured to generate feature vectors 304. The feature vectors 304 along with feature weights and offsets 306 and thresholds 308 are evaluated in step 310 to provide computed values and classifications in 312. Finally, in step 314, application-specific action is taken, e.g., disinfect programs infected with an identified virus.

Advantages

Unlike prior art methods that are limited to dozens or, at most, hundreds of features and examples, the preferred embodiment method has operated efficiently in scenarios including tens of thousands of features and thousands of examples. On a face-detection problem, the inventive method was significantly more accurate than a Fisher linear discriminant, an unrelated method well established in this application domain.

Furthermore, using prior art "back-propagation" or "perceptron" learning methods on a problem with substantially more features than training examples would result in over-training and produce meaningless results. By contrast, applying the preferred embodiment method to the same problem, most of the features, correctly, will be discarded correctly as extraneous, resulting in a useful classifier. Thus, the present invention eliminates extraneous features, attaches appropriate weights to remaining features, and handles imperfect classifiability of training examples in a single, unified mathematical framework to produce superior results.

Another method, sharing some of the same potential advantages is described by V. N. Vapnik, *The Statistical Nature of Learning Theory*, Springer (1995). In contrast to the "optimal hyperplane"-finding method described by Vapnik (pp. 127–133), the present invention uses purely linear techniques, and thus is simpler and potentially faster computationally. The two methods are not equivalent, and will produce different classifiers. Minimization of the number of non-zero feature weights is not an issue addressed by Vapnik, and, especially in combination with linear programming solvers which return "basic" feasible solutions, the inventive method is likely to be more effective at achieving this goal.

While the invention has been described in terms of preferred embodiments, those skilled in the art will recognize that the invention can be practiced with modification within the spirit and scope of the appended claims.

Having thus described my invention, what I claim as novel and desire to secure by Letters Patent is as follows:

1. A computer implemented method for constructing a linear classifier of information, said method comprising the steps of:
   a) providing a set of training examples, each of said training examples including an input vector and a classification, said input vector having components and said components being called "features", said classification being positive or negative;
   b) constructing a linear program consisting of a set of linear constraints and a linear objective function; and
   c) using linear programming (LP) to solve said set of linear constraints and linear objective function to derive a classifier consisting of a weight vector, components of said weight vector being called "weights", and an offset, a response of said classifier to a second input vector consisting of the dot product of said second input vector and the classifiers weight vector, plus the classifier's offset.

2. The method of claim 1, wherein the objective function is to minimize a positive combination of the absolute values of said weights.

3. The method of claim 2, further comprising the steps of:
   identifying in the providing step (a) zero or more of said features as excitatory, and identifying zero or more of said features as inhibitory; and
   for each excitatory feature j, constraining in the constructing step (b) the corresponding weight, $w_j$, to be at least 0, $w_j \geq 0$, and for each inhibitory feature j, constraining the corresponding weight, $w_j$, to be at most 0, $w_j \leq 0$.

4. The method of claim 3, wherein at least one feature is neither identified as excitatory nor inhibitory, the constructing step (b) further comprising the step of duplicating each said feature to provide an identical pair of features, a first one of said pair being identified as excitatory and a second one of said pair being identified as inhibitory, whereby the dimension of each input vector is increased by 1 for each said feature.

5. The method of claim 3, wherein substrings known to be present in one or more computer viruses are excitatory features.

6. The method of claim 3, wherein substrings known to be present in documents pertaining to a selected subject define excitatory features and substrings known to be present in documents pertaining to a variety of subjects define features classified neither as excitatory nor as inhibitory.

7. The method of claim 1, wherein the objective function is to minimize the sum of absolute values of said weights.

8. The method of claim 1, wherein the linear constraints constrain each positive example's response to be at least 1 and constrain each negative example's response to be at most 0.

9. The method of claim 8, wherein the linear constraints further constrain each weight to a predetermined range.

10. The method of claim 9, wherein said range is −1 to 1.

11. The method of claim 1, wherein said constraints include constraining that each response is at least 1 minus a tolerance $(x_i)$ for ones of said training examples (i) having a positive said classification and at most −1 plus a tolerance $(x_j)$ for ones of said training examples (j) having a positive said classification and wherein each tolerance $(x_i)$ is constrained to be at least zero.

12. The method of claim 11, wherein said linear objective function minimizes a positive combination of absolute values of said weights plus a positive combination of said tolerances $(x_i)$.

13. The method of claim 11, wherein said linear objective function minimizes a sum of absolute values of said weights, a "false negative" parameter value $p^+$ times the sum of tolerances for said training examples having a positive classification and a "false positive" parameter value $p^-$ times the sum of tolerances for said training examples having a negative classification.

14. The method of claim 11, wherein said constraints constrain a positive combination of said tolerances $(x_i)$ to be at most a given value and said objective is to minimize a positive combination of the absolute values of said weights.

15. The method of claim 11, wherein said constraints constrain a positive combination of the absolute values of said weights to be at most a given value and said objective is to minimize a positive combination of said tolerances $(x_i)$.

16. The method of claim 1, wherein said constraints include constraints constraining said weights to a discrete domain.

17. The method of claim 16, wherein the discrete domain is integers within a preselected range.

18. The method of claim 1, wherein the solving step (c) is performed using a linear programming technique.

19. The method of claim 1, wherein the solving step (c) is performed using an approximate, heuristic optimization method.

20. The method of claim 1, further comprising the step of selecting a set of relevant features, consisting of those features j whose corresponding weights $w_j$ have an absolute value at least as large as a preselected value.

21. A computer system for constructing a classifier comprising:
   input means for providing a set of training examples, each of said training examples including an input vector and a classification, components of said input vector being called "features", said classification being positive or negative;
   processing means for constructing a linear program consisting of a set of linear constraints and a linear objective function, said processing means solving said set of linear constraints and linear objective function to derive a classifier consisting of a weight vector, components of said vector being called "weights", and an offset;
   a response of said classifier to a new input vector consisting of the dot product of said new input vector and the classifier's weight vector, plus the classifier's offset, the classification of said classifier to said new input vector consisting of "negative" if said response is no more than a first threshold, "positive" if said response is at least a second threshold, and "don't know" if said response lies between the first and second thresholds.

22. A detector of computer viruses implemented on a storage device readable by a computer and embodying a program of instructions executable by the computer, the detector incorporating a classifier constructed by the steps of:

providing a set of training examples, each of said training examples including an input vector and a classification, components of said input vector being called "features", said classification being positive or negative, and identifying zero or more of said features as excitatory and identifying zero or more of said features as inhibitory, wherein substrings known to be present in one or more computer viruses are excitatory features;

constructing a linear program consisting of a set of linear constraints and a linear objective function, and for each excitatory feature j, constraining the corresponding weight, $w_j$, to be at least 0, $w_j \geq 0$, and for each inhibitory feature j, constraining the corresponding weight, $w_j$, to be at most 0, $w_j \leq 0$; and solving said set of linear constraints and linear objective function to derive a classifier consisting of a weight vector, components of said weight is vector being called "weights", and an offset, a response of said classifier to a new input vector consisting of the dot product of said new input vector and the classifiers weight vector, plus the classifier's offset.

23. A detector of computer viruses recited in claim 22, wherein the detector performs a classification of an input datum as "viral", "non-viral" or "don't know" and the classification of said input datum is performed by the steps of:

measuring the presence of each feature in said input datum to form a new input vector;

adding the classifier's offset to the dot product of the classifier's weight vector with said new input vector to form a response;

comparing said response with first and second thresholds; and classifying said input datum as non-viral if said response is no more than the first threshold, classifying said input datum as viral if said response is at least the second threshold, and classifying said input datum as "don't know" if said response is between the first and second thresholds.

* * * * *